(12) United States Patent
Uehara et al.

(10) Patent No.: US 11,912,309 B2
(45) Date of Patent: *Feb. 27, 2024

(54) TRAVEL CONTROL DEVICE AND TRAVEL CONTROL METHOD

(71) Applicant: TOYOTA JIDOSHA KABUSHIKI KAISHA, Toyota (JP)

(72) Inventors: Yasuo Uehara, Gotemba (JP); Nobuhide Kamata, Susono (JP); Nozomu Hatta, Susono (JP); Shunsuke Tanimori, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/145,294

(22) Filed: Dec. 22, 2022

(65) Prior Publication Data
US 2023/0119887 A1     Apr. 20, 2023

Related U.S. Application Data

(63) Continuation of application No. 16/788,653, filed on Feb. 12, 2020, now Pat. No. 11,648,964.

(30) Foreign Application Priority Data

Feb. 14, 2019 (JP) .................................. 2019-024528

(51) Int. Cl.
*B60W 60/00* (2020.01)
*G05D 1/00* (2006.01)
(Continued)

(52) U.S. Cl.
CPC ..... *B60W 60/00253* (2020.02); *G05D 1/0088* (2013.01); *G05D 1/0212* (2013.01);
(Continued)

(58) Field of Classification Search
None
See application file for complete search history.

(56) References Cited

U.S. PATENT DOCUMENTS

2017/0008490 A1   1/2017   Sako et al.
2018/0297612 A1   10/2018  Fukamachi
(Continued)

FOREIGN PATENT DOCUMENTS

JP   2002032897 A   1/2002
JP   2015191264 A   11/2015
(Continued)

*Primary Examiner* — Peter D Nolan
*Assistant Examiner* — Mikko Okechukwu Obioha
(74) *Attorney, Agent, or Firm* — Hunton Andrews Kurth LLP

(57) ABSTRACT

A travel control device is configured to make an autonomous driving vehicle travel in such a way that the autonomous driving vehicle arrives at a specified position specified by a user who intends to board the autonomous driving vehicle, when the autonomous driving vehicle has reached a predetermined range from the specified position, transmit an information sending request notifying the user terminal that the autonomous driving vehicle has reached a vicinity of the specified position and requesting sending of position identifying information for identifying a position at which the user intends to board the autonomous driving vehicle to the user terminal via a communication circuit, and when receiving the position identifying information via the communication circuit, change a position of the autonomous driving vehicle, based on the position identifying information in such a way that the autonomous driving vehicle comes close to the user.

6 Claims, 13 Drawing Sheets

(51) Int. Cl.
    *G05D 1/02*       (2020.01)
    *G06T 7/73*       (2017.01)
(52) U.S. Cl.
    CPC ......... *G05D 1/0231* (2013.01); *G05D 1/0276* (2013.01); *G06T 7/73* (2017.01); *B60W 2556/45* (2020.02); *G05D 2201/0213* (2013.01); *G06T 2207/30248* (2013.01)

(56) References Cited

U.S. PATENT DOCUMENTS

| | | | |
|---|---|---|---|
| 2019/0166473 A1* | 5/2019 | Venkatraman | H04W 4/029 |
| 2020/0363825 A1* | 11/2020 | Aoki | G08G 1/137 |
| 2021/0264783 A1* | 8/2021 | Suzuki | H04N 23/90 |
| 2022/0055657 A1* | 2/2022 | McIntosh | B60W 60/0025 |
| 2022/0319334 A1* | 10/2022 | Xiao | G01C 21/3461 |

FOREIGN PATENT DOCUMENTS

| | | | |
|---|---|---|---|
| JP | 2016115364 A | 6/2016 |
| JP | 2017096635 A | 6/2017 |
| JP | 2017182137 A | 10/2017 |
| JP | 2018180946 A | 11/2018 |
| JP | 2019121049 A | 7/2019 |

* cited by examiner

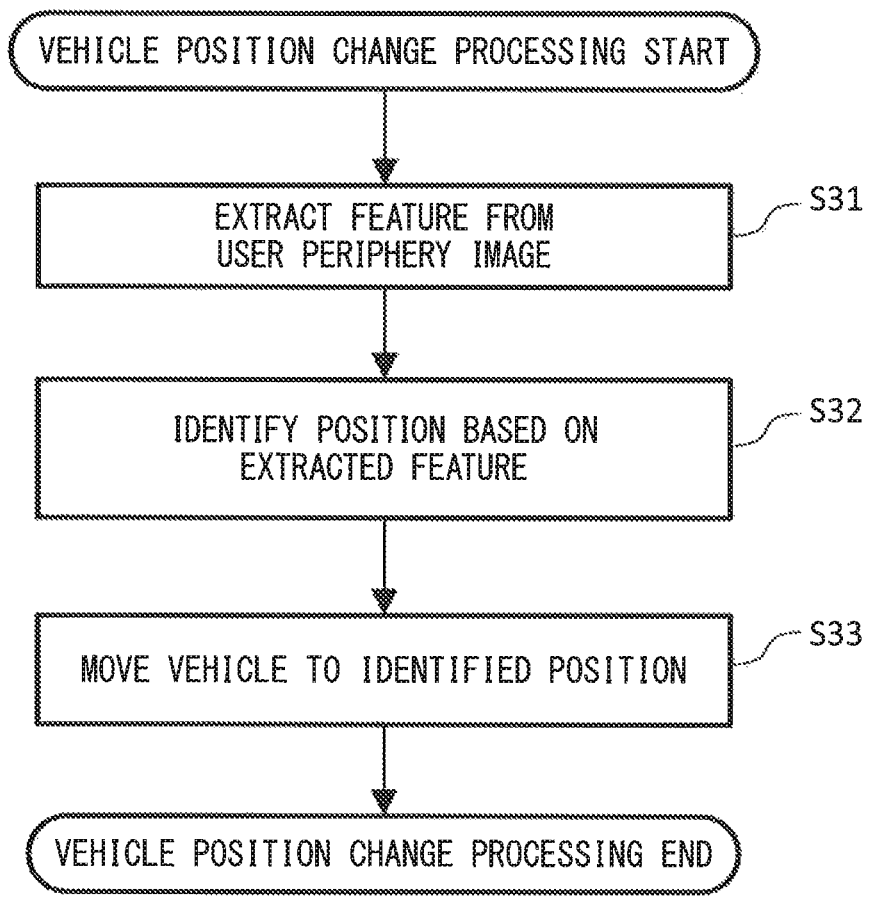

TRAVEL CONTROL DEVICE AND TRAVEL CONTROL METHOD

CROSS-REFERENCE TO RELATED APPLICATION

This is a continuation application of U.S. patent application Ser. No. 16/788,653, filed Feb. 12, 2020, which claims priority to Japanese Patent Application No. 2019-024528 filed on Feb. 14, 2019, which is incorporated herein by reference in its entirety.

FIELD

The present disclosure relates to a travel control device and a travel control method.

BACKGROUND

A transportation service providing system is known that makes an autonomous driving vehicle travel toward a destination specified by a dispatch device and provides a user with a transportation service. The dispatch device specifies a destination of the autonomous driving vehicle, based on information such as a boarding request, a getting-off request, etc., from the user. The autonomous driving vehicle travels toward the destination under control of a travel control device mounted on the vehicle, controlling operation of the vehicle, such as power, steering, and braking. The travel control device controls travel of the autonomous driving vehicle, based on information related to the vehicle, such as position information output by a positioning device mounted on the vehicle and image information acquired by an imaging device mounted on the vehicle.

In a transportation service providing system, a user who desires to board an autonomous driving vehicle specifies a boarding position via a dispatch device, and the autonomous driving vehicle travels toward the specified position, based on control by the travel control device. When the autonomous driving vehicle arrives at the specified position, the user can board the autonomous driving vehicle.

PTL 1 describes a self-driving device that, after an autonomous driving vehicle has arrived at a specified destination, makes a notification depending on whether or not a user has boarded or gotten-off the autonomous driving vehicle.

CITATION LIST

Patent Literature

[PTL 1] Japanese Patent Laid-open No. 2018-180946

SUMMARY

Technical Problem

A travel control device controls travel of an autonomous driving vehicle in such a way that position information of the autonomous driving vehicle that is measured using a satellite positioning system, etc., coincides with a destination.

When a facility having large site area is specified as a boarding position, the position at which a user is present does not always coincide with the position specified as a boarding position. For example, when a user is present at a south side entrance of a facility despite that a north side entrance of the facility is specified as a boarding position, the boarding position and the position at which the user is present are not coincident with each other. In this case, the autonomous driving vehicle is unable to reach the position at which the user is present.

A case where position information acquired using a satellite positioning system contains an error also causes an actual position of the autonomous driving vehicle not to coincide with a boarding position specified as a destination. In this case, the autonomous driving vehicle is also unable to reach the position at which the user is present.

When the autonomous driving vehicle is unable to reach the position at which the user is present, the user needs to move to the actual position of the autonomous driving vehicle in order to board the autonomous driving vehicle. In particular, when there is some obstacle between the user and the autonomous driving vehicle, such as when the position of the autonomous driving vehicle and the position of the user are on the north side and the south side of a facility or the former is before an intersection and the latter is after a left turn at the intersection, respectively, the user is unable to visually recognize the autonomous driving vehicle. Therefore, it is not always easy for the user to move toward the autonomous driving vehicle.

The self-driving device in PTL 1 determines whether or not a vehicle has arrived at a boarding position, based on a vehicle position on a map that is recognized based on position information from a GPS reception unit and map information in a map database. In the self-driving device in PTL 1, since it is determined that the vehicle has arrived at a boarding position even when an actual position of the user does not coincide with the destination, there is a possibility that a problem as described above may occur.

An object of the present disclosure is to provide a travel control device controlling travel of an autonomous driving vehicle in such a way that the autonomous driving vehicle that has reached a vicinity of a position that a user specifies comes close to a position at which the user is actually present.

Solution to Problem

A travel control device according to the present disclosure includes a specified position travel unit configured to make an autonomous driving vehicle travel in such a way that the autonomous driving vehicle arrives at a specified position specified by a user who intends to board the autonomous driving vehicle, a request transmission unit configured to, when the autonomous driving vehicle has reached a predetermined range from the specified position, transmit, to a user terminal that the user has, an information sending request notifying the user terminal that the autonomous driving vehicle has reached a vicinity of the specified position and requesting sending of position identification information for identifying a position at which the user intends to board the autonomous driving vehicle, via a communication unit configured to be communicable with the user terminal, and a position change unit configured to, when receiving the position identification information via the communication unit, make the autonomous driving vehicle move in such a way that the autonomous driving vehicle comes close to the user, based on the position identification information.

In the travel control device according to the present disclosure, the position identification information is preferably a user periphery image depicting a peripheral region around the user.

The travel control device according to the present disclosure preferably further includes a vehicle periphery image acquisition unit configured to acquire a vehicle periphery image that is captured by an imaging unit disposed on the autonomous driving vehicle and depicts a peripheral region around the autonomous driving vehicle, and the position change unit preferably makes the autonomous driving vehicle move in such a way that a relevance level between the user periphery image and the vehicle periphery image increases.

The travel control device according to the present disclosure preferably further includes a vehicle periphery image acquisition unit configured to acquire a vehicle periphery image depicting a peripheral region around the autonomous driving vehicle from a route image server storing, in association with position information, periphery images on a route along which the autonomous driving vehicle travels, via a network, and the position change unit preferably makes the autonomous driving vehicle move in such a way that a relevance level between the user periphery image and the vehicle periphery image increases.

In the travel control device according to the present disclosure, the request transmission unit preferably requests transmission of an image of the opposite side of the position of the user to the side on which the autonomous driving vehicle travels.

In the travel control device according to the present disclosure, the position change unit preferably makes the autonomous driving vehicle move in such a way that the autonomous driving vehicle comes close to a position identified based on a feature extracted from the user periphery image.

In the travel control device according to the present disclosure, the position identification information is preferably the name of a building in a peripheral region around the user.

In the travel control device according to the present disclosure, the position change unit preferably makes the autonomous driving vehicle move in such a way that the autonomous driving vehicle comes close to a position identified based on the name of a building in a peripheral region around the user.

In the travel control device according to the present disclosure, the position identification information is preferably coordinate information corresponding to the position of the user.

In the travel control device according to the present disclosure, the position change unit preferably makes the autonomous driving vehicle move in such a way that the position of the autonomous driving vehicle comes close to a position indicated by the coordinate information.

A travel control method according to the present disclosure is a travel control method for controlling travel of an autonomous driving vehicle by means of a travel control device and includes: the travel control device making the autonomous driving vehicle travel in such a way that the autonomous driving vehicle arrives at a specified position specified by a user who intends to board the autonomous driving vehicle; when the autonomous driving vehicle has reached a predetermined range from the specified position, the travel control device transmitting, to a user terminal that the user has, an information sending request notifying that the autonomous driving vehicle has reached a vicinity of the specified position and requesting sending of position identification information for identifying a position at which the user intends to board the autonomous driving vehicle, via a communication unit configured to be communicable with the user terminal; and, when receiving the position identification information via the communication unit, the travel control device making the autonomous driving vehicle move, based on the position identification information in such a way that the autonomous driving vehicle comes close to the user.

A travel control device according to the present disclosure enables travel of an autonomous driving vehicle to be controlled in such a way that the autonomous driving vehicle that has reached a vicinity of a position that a user specifies comes close to a position at which the user is actually present.

BRIEF DESCRIPTION OF DRAWINGS

FIG. 15 is a third processing flowchart of the vehicle position change processing in the travel control device.

DETAILED DESCRIPTION OF INVENTION

A travel control device and a travel control method will be described in detail below with reference to the drawings. However, it should be noted that the present disclosure is not limited to the drawings or below described embodiments.

The travel control device according to the present disclosure controls travel of an autonomous driving vehicle in such a way that the autonomous driving vehicle arrives at a specified position specified by a user who intends to board the autonomous driving vehicle. When the autonomous driving vehicle has reached a predetermined range from the specified position, the travel control device transmits, via a communication unit configured to be communicable with a communication terminal that the user has, an information sending request to the user terminal. The information sending request is information notifying that the autonomous driving vehicle has reached a vicinity of the specified position and therewith requesting sending of position identification information for identifying a position at which the user intends to board the autonomous driving vehicle. When receiving the position identification information via the communication unit, the travel control device controls, based on the position identification information, travel of the autonomous driving vehicle in such a way that the autonomous driving vehicle comes close to the user. By a series of process above, the travel control device can control travel of an autonomous driving vehicle in such a way that the autonomous driving vehicle that has reached a vicinity of a position that a user specifies comes close to a position at which the user actually present.

Figure 1:
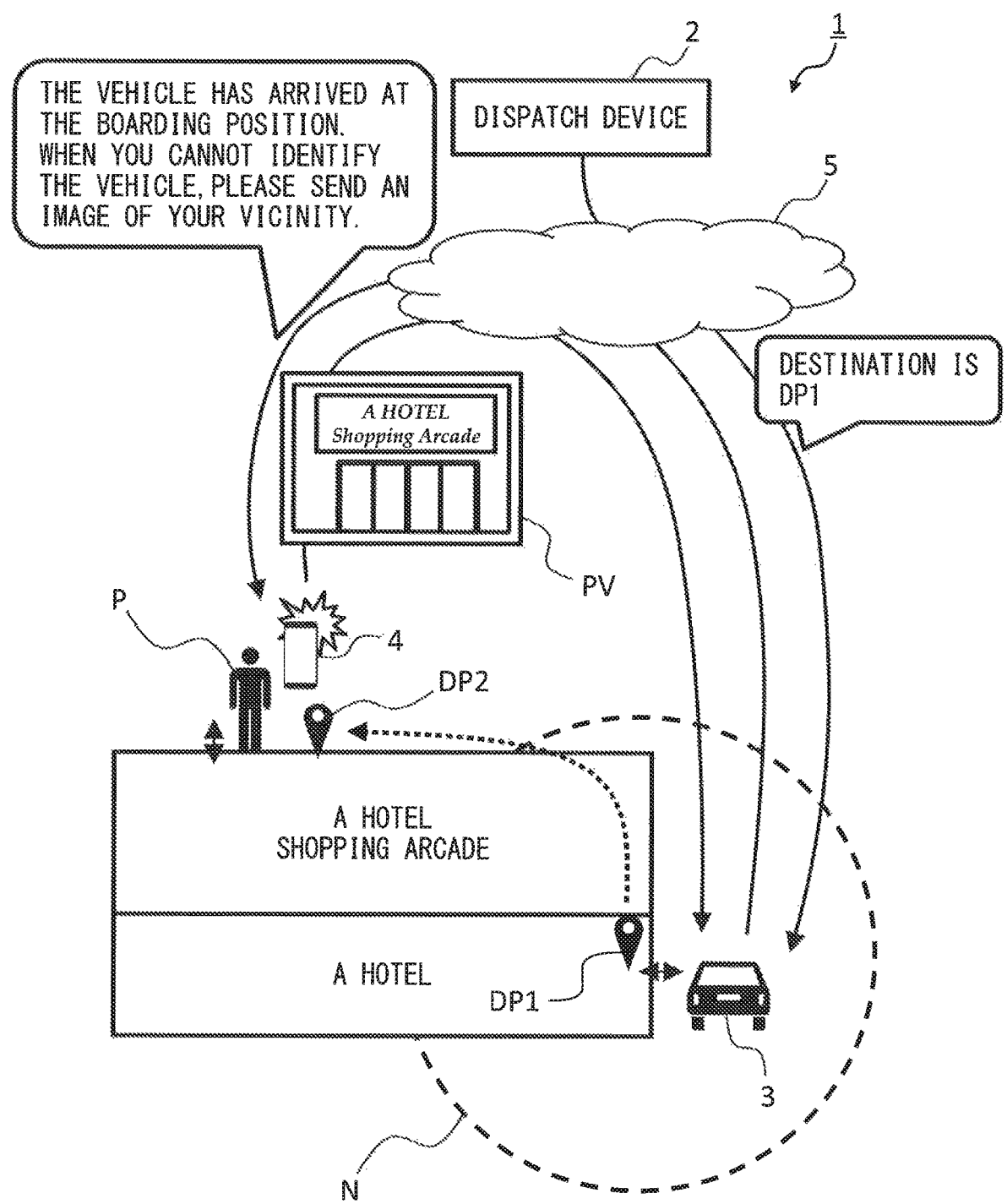
FIG. 1 is a schematic diagram illustrating an operation of a transportation service providing system.

FIG. 1 is a schematic diagram illustrating an operation of a transportation service providing system 1.

The transportation service providing system 1 includes a dispatch device 2, an autonomous driving vehicle 3, and a user terminal 4 that a user P who intends to board the autonomous driving vehicle 3 has. The dispatch device 2, the autonomous driving vehicle 3, and the user terminal 4 are interconnected via a network 5.

The dispatch device 2 specifies, based on a request from the user P, a position DP1 as a destination to the autonomous driving vehicle 3. The autonomous driving vehicle 3, controlled by a travel control device mounted on the autonomous driving vehicle 3, travels toward the position DP1. When reaching a predetermined range N from the position DP1, the autonomous driving vehicle 3 transmits an information sending request to the user terminal 4. The information sending request is information notifying that the autonomous driving vehicle has reached a vicinity of the specified position and therewith requesting sending of position identification information for identifying a position at which the user intends to board the autonomous driving vehicle. In the example in FIG. 1, the autonomous driving vehicle 3 requests, as position identification information, a user periphery image depicting a peripheral region around the user. The user P operates the user terminal 4, based on the information sending request, acquires a user periphery image PV, and transmits the acquired user periphery image PV to the autonomous driving vehicle 3. The autonomous driving vehicle 3 changes its position, based on the user periphery image in such a way as to come close to a position DP2 of the user P. This configuration enables the travel control device to control travel of an autonomous driving vehicle in such a way that the autonomous driving vehicle that has reached a vicinity of a position that a user specifies comes close to a position at which the user is actually present.

The dispatch device 2, the travel control device mounted on the autonomous driving vehicle 3, and the user terminal 4 are connected to the network 5. The network 5 is, for example, the Internet in which communication is performed in accordance with the transport control protocol/Internet protocol (TCP/IP). Devices communicating via the network 5 are connected to the network 5 in a wired or wireless manner. Connection in a wireless manner may be a wireless local area network (LAN) connection, such as the Institute of Electrical and Electronics Engineers (IEEE) 802.11ac. In addition, connection in a wireless manner may be a wireless wide area network (WAN) connection, such as a 4th generation (4G) network and 5th generation (5G) network.

Figure 2:
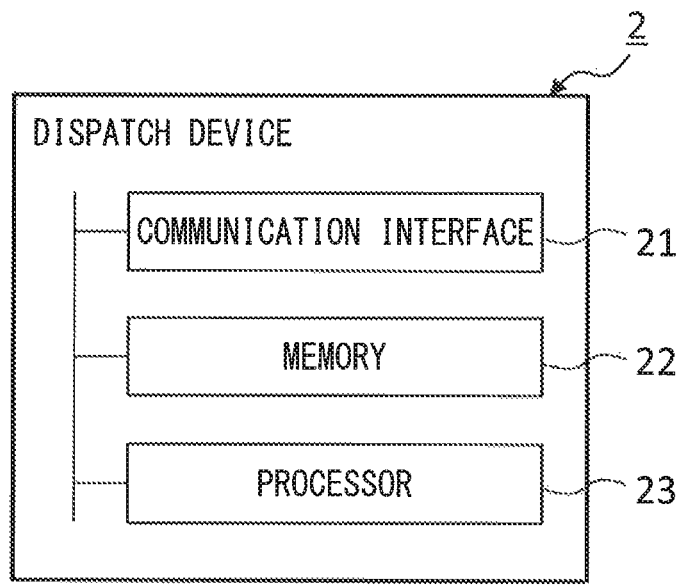
FIG. 2 is a hardware schematic diagram of a dispatch device.

FIG. 2 is a hardware schematic diagram of the dispatch device.

The dispatch device 2 connects to the autonomous driving vehicle 3 via the network 5 and acquires position information indicating a traveling position of the autonomous driving vehicle 3 and user information indicating boarding status of a user who is to board the autonomous driving vehicle 3. In addition, the dispatch device 2 connects to the user terminal 4 via the network 5 and receives a dispatch request requesting dispatch of a vehicle to a specified position. The dispatch device 2 dispatches the autonomous driving vehicle 3 by transmitting position identifying information specifying the specified position as a destination to the autonomous driving vehicle 3 via the network 5. For this purpose, the dispatch device 2 includes a communication interface 21, a memory 22, and a processor 23.

The communication interface 21 is a communication interface circuit for connecting the dispatch device 2 to the network 5. The communication interface 21 supplies the processor 23 with data received from the autonomous driving vehicle 3 via the network 5. Further, the communication interface 21 transmits data supplied from the processor 23 to the autonomous driving vehicle 3 via the network 5.

The memory 22 is, for example, at least one of a semiconductor memory, a magnetic disk device, and an optical disk device. The memory 22 stores driver programs, operating system programs, application programs, data, etc., that are used in processing performed by the processor 23. For example, the memory 22 stores, as driver programs, communication device driver programs, etc., that control the communication interface 21. The various types of programs may be installed in the memory 22 from a computer-readable portable recording medium by use of a known setup program, etc. Examples of the computer-readable portable recording medium include a compact disc read-only memory (CD-ROM) and a DVD read-only memory (DVD-ROM). Further, the memory 22 stores various types of data, such as the user information and a present position of the autonomous driving vehicle 3, that are to be used for dispatch of the autonomous driving vehicle.

The processor 23 is one or more processors and peripheral circuits thereof. The processor 23 is a component configured to integrally control whole operation of the dispatch device 2 and is, for example, a central processing unit (CPU). The processor 23 controls operation of the communication interface 21, etc., in such a way that various types of processing of the dispatch device 2 are executed by appropriate means based on the programs, etc., stored in the memory 22. The processor 23 executes processing based on the programs (the operating system programs, the driver programs, the application programs, etc.) stored in the memory 22. Further the processor 23 is capable of executing a plurality of programs (application programs, etc.) in parallel.

Figure 3:
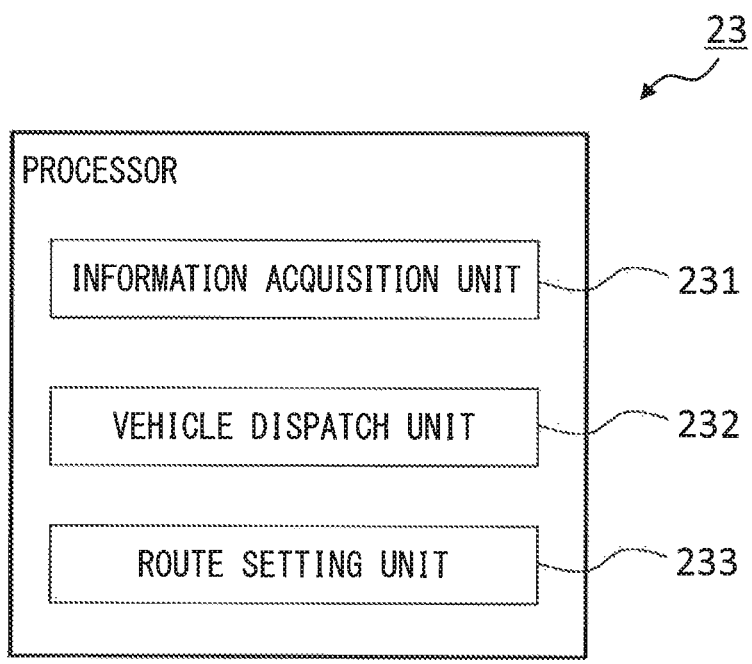
FIG. 3 is a functional block diagram of a processor included in the dispatch device.

FIG. 3 is a functional block diagram of the processor included in the dispatch device.

The processor 23 of the dispatch device 2 includes, as functional blocks, an information acquisition unit 231, a vehicle dispatch unit 232, and a route setting unit 233. These units of the processor 23 are functional modules implemented by programs executed in the processor 23. Alternatively, these units of the processor 23 may be implemented in the dispatch device 2 as discrete integrated circuits, microprocessors, or firmware.

The information acquisition unit 231 acquires, with respect to each of a plurality of autonomous driving vehicles 3, position information and user information of the autonomous driving vehicle via the communication interface 21. The information acquisition unit 231 stores the acquired position information and user information in association with each other in the memory 22. The position information is information identifying a position of the autonomous driving vehicle 3 and is represented by, for example, a longitude and a latitude. The user information is information on a user(s) boarding on the autonomous driving vehicle 3 and includes the passenger number that is the number of users who are boarding on the autonomous driving vehicle 3. Acquisition of position information and user information in each autonomous driving vehicle 3 will be described later.

In addition, the information acquisition unit 231 receives a dispatch request from the user terminal 4 via the communication interface 21. The dispatch request is a signal requesting dispatch of an autonomous driving vehicle 3 to a specified position. The dispatch request includes user terminal connection information for connection to the user terminal 4. The user terminal connection information is, for example, an IP address or the phone number of the user terminal 4, an e-mail address of the user P, etc.

The vehicle dispatch unit 232 dispatches an autonomous driving vehicle 3, based on a dispatch request and the position information and user information of the autonomous driving vehicles. Specifically, first, the vehicle dispatch unit 232 identifies an autonomous driving vehicle(s) that the user can board, based on boarding information of the autonomous driving vehicles. Next, the vehicle dispatch unit 232 identifies, among the autonomous driving vehicle(s) that the user can board, an autonomous driving vehicle that minimizes the time to reach the specified position indicated by the dispatch request. The vehicle dispatch unit 232 transmits position identifying information identifying the specified position specified by the dispatch request as a destination to the autonomous driving vehicle that the user can board and that minimizes the time to reach the specified position via the communication interface 21. The position identifying information includes the user terminal connection information included in the dispatch request.

The route setting unit 233 sets, with respect to each of the autonomous driving vehicles 3, a travel route that indicates predicted traveling positions at every time point from a present traveling position to the destination. The travel route set by the route setting unit 233 is transmitted to the autonomous driving vehicle 3 as position identifying information by the vehicle dispatch unit 232 via the communication interface 21.

The route setting unit 233 sets a travel route in accordance with a predetermined route searching program using, for example, a Dijkstra's algorithm.

Figure 4:
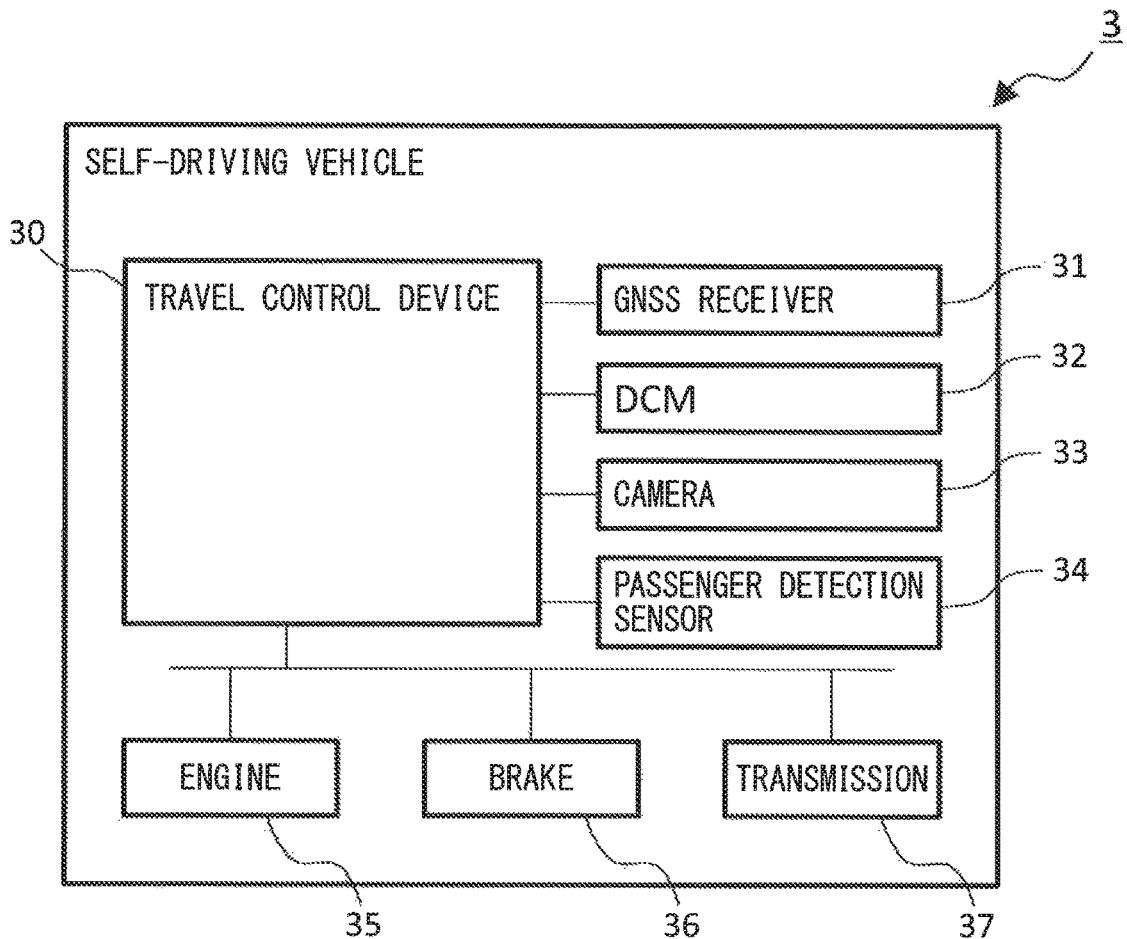
FIG. 4 is a hardware schematic diagram of an autonomous driving vehicle.

FIG. 4 is a hardware schematic diagram of an autonomous driving vehicle.

The autonomous driving vehicle 3 includes a travel control device 30, a GNSS (global navigation satellite system) receiver 31 configured to receive signals transmitted by GNSS satellites and identify a present position, a data communication module (DCM) 32, a camera 33, and sensors configured to detect passengers or passenger information collection devices (hereinafter referred to as "passenger detection sensors") 34. Further, the autonomous driving vehicle 3 includes an engine or electric vehicle (EV) system (hereinafter referred to as "engine") 35, a deceleration device (hereinafter referred to as "brake") 36, such as a brake and an energy regeneration device, and a transmission 37.

The travel control device 30 transmits position information of the autonomous driving vehicle 3 acquired by the GNSS receiver 31 to the dispatch device 2 via the data communication module 32. Further, the travel control device 30 receives position identifying information specifying a specified position specified by a user as a destination via the data communication module 32.

Further, the travel control device 30 is connected to the engine 35, brake 36, and transmission 37 of the autonomous driving vehicle 3 via a communication interface and electronically controls operations of the engine 35, brake 36, and transmission 37 of the autonomous driving vehicle 3. The travel control device 30 controls operation of the engine 35, etc., of the autonomous driving vehicle 3 and thereby makes the autonomous driving vehicle 3 travel toward the destination. A detailed configuration of the travel control device 30 will be described later.

The GNSS receiver 31 identifies a present position, based on signals received from the GNSS satellites. Examples of the GNSS include the global positioning system (GPS), Galileo, GLONASS, the BeiDou navigation satellite system, and the quasi-zenith satellite system (QZSS). The GNSS receiver 31 is connected to the travel control device 30, and the travel control device 30 is able to detect a present position of the autonomous driving vehicle 3 by use of the GNSS receiver 31. The GNSS receiver 31 may identify a present position by means of a technology other than the satellite positioning system, such as simultaneous location and mapping (SLAM) using a database based on feature amounts of images acquired by image sensors and SLAM using a spatial distribution database of feature amounts obtained by light detection and ranging (LIDAR), radio detection and ranging (RADAR), etc.

The data communication module 32 includes a communication interface for connecting to the network 5. The data communication module 32 executes communication with external devices, such as the dispatch device 2. The data communication module 32 is connected to the travel control device 30, and the travel control device 30 is able to transmit and receive data to and from devices connected to the network 5, such as the dispatch device 2, via the data communication module 32.

The camera 33 includes an imaging optical system and an image sensor and is installed in such a way as to capture an image depicting a peripheral region around the autonomous driving vehicle 3. For example, the camera 33 is installed in a vicinity of a side surface of the autonomous driving vehicle 3 in such a way as to face the outer side with respect to the center line in the longitudinal direction. In that case, the camera 33 is capable of acquiring an image in a side surface direction from the autonomous driving vehicle. The camera 33 is connected to the travel control device 30, and the travel control device 30 is able to acquire an image of a periphery around the autonomous driving vehicle 3 via the camera 33.

The passenger detection sensors 34 are, for example, weight sensors installed in the respective seats of the autonomous driving vehicle 3. In this case, the travel control device 30 detects, based on weight that each of the passenger detection sensors 34 detects, whether or not a user is boarding on the autonomous driving vehicle 3 as a passenger. Further, the passenger detection sensor 34 may be a camera configured to acquire an image of the inside of the passenger compartment of the autonomous driving vehicle 3 or sensors configured to detect heartbeats of passengers. For example, when the passenger detection sensor is a camera, the travel control device 30 detects whether or not a passenger is boarding on the autonomous driving vehicle 3 by, for example, inputting an image that the passenger detection sensors 34 output into a discriminator that is trained in advance to detect a person depicted in an image.

Figure 5:
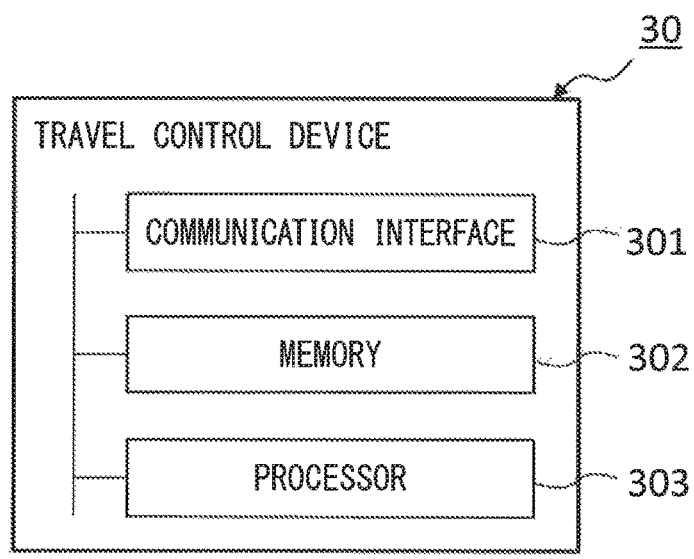
FIG. 5 is a hardware schematic diagram of a travel control device.

FIG. 5 is a hardware schematic diagram of the travel control device.

The travel control device 30 includes a communication interface 301, a memory 302, and a processor 303. The travel control device 30 is mounted on the autonomous driving vehicle 3 as an electronic control unit (ECU).

The communication interface 301 is a communication interface circuit for connecting the travel control device 30 to other devices mounted on the autonomous driving vehicle 3, such as the GNSS receiver 31, the data communication module 32, the camera 33, and the passenger detection sensors 34. The communication interface 301 supplies the processor 303 with data received from the other devices. Further, the communication interface 301 transmits data supplied from the processor 303 to the other devices.

The memory 302 stores a predetermined range threshold value for determining whether or not the autonomous driving vehicle 3 has reached a specified destination. The memory 302 supplies the processor 303 with the predetermined range threshold value in response to a request from the processor 303. Further, the memory 302 may store data used in processing that the processor 303 executes, such as an identifier uniquely identifying the autonomous driving vehicle 3.

The processor 303 performs arithmetic operations based on signals supplied from the communication interface 301, and outputs signals to the communication interface 301. The processor 303 performs the arithmetic operations by executing a predetermined program.

Figure 6:
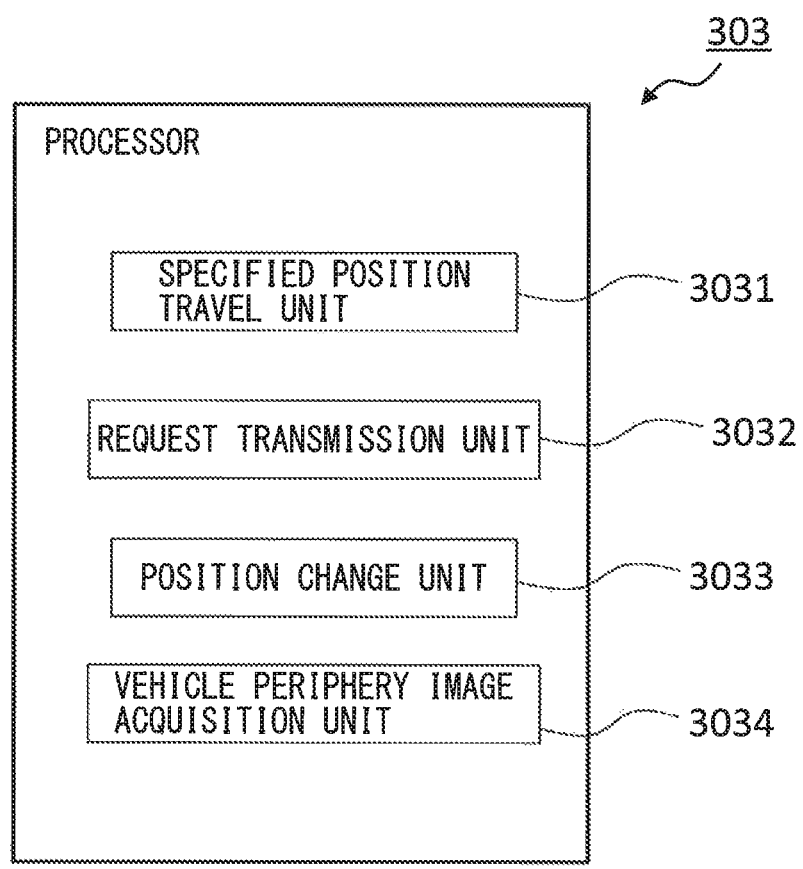
FIG. 6 is a functional block diagram of a processor included in the travel control device.

FIG. 6 is a functional block diagram of the processor included in the travel control device.

The processor 303 of the travel control device 30 includes, as functional blocks, a specified position travel unit 3031, a request transmission unit 3032, a position change unit 3033, and a vehicle periphery image acquisition unit 3034. The respective units of the processor 303 are functional modules that are implemented by programs executed in the processor 303. Alternatively, the respective units of the processor 303 may be implemented in the travel control device 30 as dedicated circuits.

The specified position travel unit 3031 makes the autonomous driving vehicle 3 travel in such a way that the autonomous driving vehicle 3 arrives at a specified position specified by the user P who intends to board the autonomous driving vehicle 3. The specified position travel unit 3031 receives position identifying information from the dispatch device 2 via the network 5, the data communication module 32, and the communication interface 301. The specified position travel unit 3031 controls operation of the engine 35, etc., based on the received position identifying information and thereby makes the autonomous driving vehicle 3 travel toward the destination.

When the autonomous driving vehicle 3 has reached a predetermined range from the specified position, the request transmission unit 3032 transmits an information sending request to the user terminal 4 via the communication interface 301, the data communication module 32, and the network 5. The information sending request is information notifying that the autonomous driving vehicle 3 has reached a vicinity of the specified position and therewith requesting sending of position identifying information. The position identifying information is information for identifying a position at which the user P intends to board the autonomous driving vehicle 3, and is acquired using the user terminal 4. The position identifying information may be the present position of the user P or a position different from the present position of the user P. The acquisition of position identifying information using the user terminal 4 will be described later.

The transmission of information sending request by the request transmission unit 3032 to the user terminal 4 is performed by the travel control device 30 and the user terminal 4 directly communicating with each other via the network 5, based on the user terminal connection information included in the position identifying information for specifying the specified position as a destination. Further, the transmission of information sending request by the request transmission unit 3032 may be performed by the dispatch device 2, which is connected to the travel control device 30 and the user terminal 4 via the network 5, mediating communication between the travel control device 30 and the user terminal 4.

The position change unit 3033 receives position identifying information from the user terminal 4 via the network 5, the data communication module 32, and the communication interface 301. The position change unit 3033 controls operation of the engine 35, etc., based on the received position identifying information, and makes the autonomous driving vehicle 3 move in such a way that the autonomous driving vehicle 3 comes close to the user. The movement of the autonomous driving vehicle 3 based on the position identifying information will be described later.

The vehicle periphery image acquisition unit 3034 acquires a vehicle periphery image that was captured by the camera 33 and depicts a peripheral region around the autonomous driving vehicle.

In addition, the vehicle periphery image acquisition unit 3034 may acquire a vehicle periphery image from a route image server (not shown) connected to the network 5, via the network 5, the data communication module 32, and the communication interface 301. The route image server stores, in association with position information, periphery images on routes along which the autonomous driving vehicles travel. The vehicle periphery image acquisition unit 3034 transmits position information of the autonomous driving vehicle 3 that the GNSS receiver 31 has acquired to the route image server, receives a periphery image associated with the position information from the route image server, and acquires the received periphery image as a vehicle periphery image.

The acquisition of a vehicle periphery image by the vehicle periphery image acquisition unit 3034 will be described later.

Figure 7:
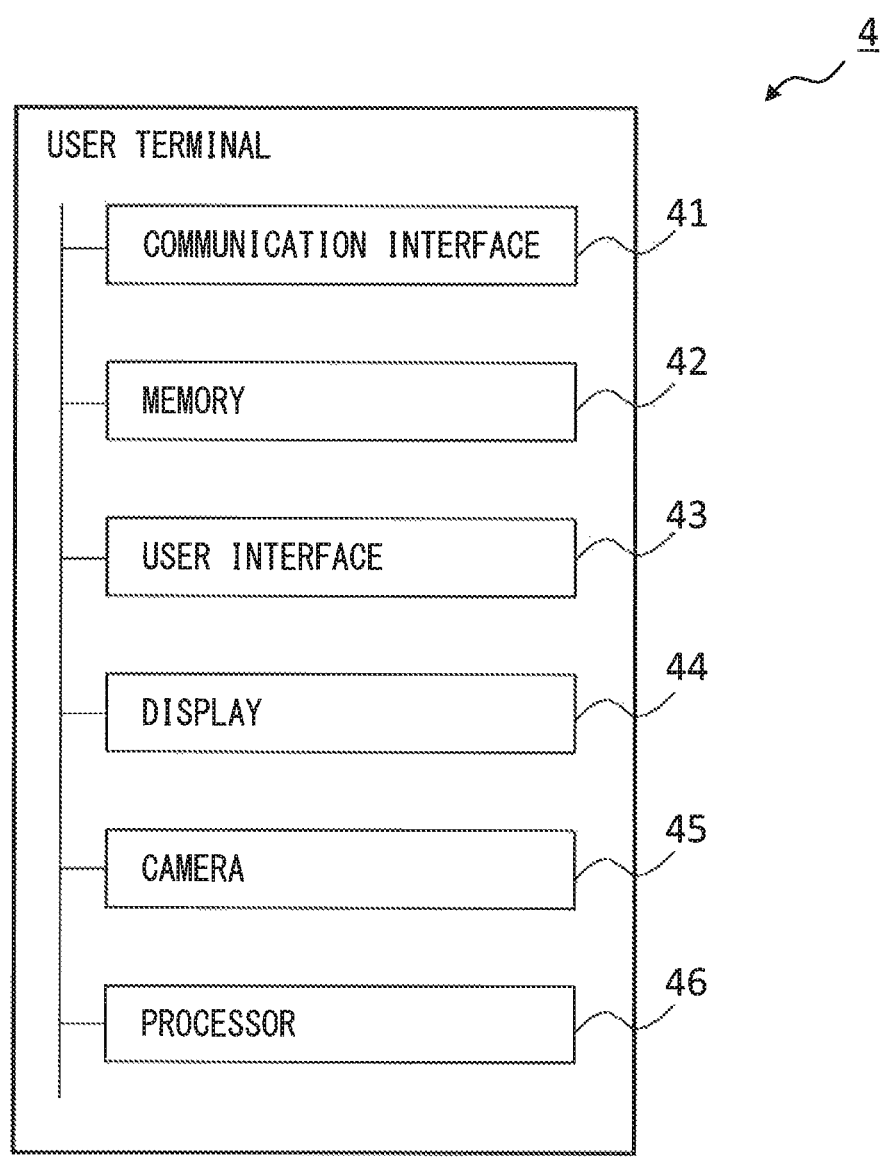
FIG. 7 is a hardware schematic diagram of a user terminal.

FIG. 7 is a hardware schematic diagram of the user terminal.

The user terminal 4 is a mobile terminal that the user P, who intends to board the autonomous driving vehicle 3, has. The user terminal 4 connects to the dispatch device 2 via the network 5 and transmits a dispatch request requesting dispatch of a vehicle to a specified position, based on an operation by the user P. Further, the user terminal 4 connects to the autonomous driving vehicle 3 via the network 5 and receives an information sending request. The user terminal 4 acquires position identifying information, based on an operation by the user P referring to a display screen corresponding to the information sending request and transmits the acquired position identifying information to the autonomous driving vehicle 3 via the network 5. For this purpose, the user terminal 4 includes a communication interface 41, a memory 42, a user interface 43, a display 44, a camera 45, and a processor 46.

The communication interface 41 is a communication interface circuit for connecting the user terminal 4 to the network 5. The communication interface 41 supplies the processor 46 with data received from the dispatch device 2 and the autonomous driving vehicle 3 via the network 5. Further, the communication interface 41 transmits data supplied from the processor 46 to the dispatch device 2 and the autonomous driving vehicle 3 via the network 5.

The memory 42 is, for example, at least one of a semiconductor memory, a magnetic disk device, and an optical disk device. The memory 42 stores driver programs, operating system programs, application programs, data, etc., that are used in processing performed by the processor 46. For example, the memory 42 stores, as driver programs, communication device driver programs, etc., that control the communication interface 41. The various types of programs may be installed in the memory 42 from a computer-readable portable recording medium by use of a known setup program, etc. Examples of the computer-readable portable recording medium include a compact disc read-only memory (CD-ROM) and a DVD read-only memory (DVD-ROM). Further, the memory 42 stores various types of data, such as the user terminal connection information, that are required for dispatch of an autonomous driving vehicle.

The user interface 43 is a device configured to accept user operation to, or output user-sensitive data from the user terminal 4, and is, for example, a touch panel or key buttons for accepting an operation by the user P, a microphone, a speaker, etc. The user P is able to, using the user interface 43, input instructions, etc., to specific coordinates on the screen, such as characters, numerals, symbols, etc. The user interface 43, when operated by the user P, generates a signal corresponding to the operation. The generated signal is supplied to the processor 46 as an instruction from the user P. Further, the user interface 43 outputs voices, etc., according to a signal generated by the processor 46.

The display 44 is a device configured to perform display of images and is, for example, a liquid crystal display or an organic electro-luminescence (EL) display. The display 44 displays images in accordance with image data requested by the processor 46.

The camera 45 includes an imaging optical system and an image sensor and is configured to capture an image depicting a peripheral region around the user terminal 4. In accordance with a shooting instruction input to the user interface 43 of the user terminal 4 held by the user P, the camera 45 acquires a user periphery image depicting a peripheral region around the user. The user periphery image is an example of the position identifying information.

The processor 46 is one or more processors and peripheral circuits thereof. The processor 46 is a component configured to integrally control the whole operation of the user terminal 4, and is, for example, a central processing unit (CPU). The processor 46 controls operation of the communication interface 41, etc., in such a way that various pieces of processing of the user terminal 4 are executed by appropriate means based on the programs, etc., stored in the memory 42. The processor 46 executes processing, based on the programs (the operating system programs, the driver programs, the application programs, etc.) stored in the memory 42. Further, the processor 46 is capable of executing a plurality of programs (application programs, etc.) in parallel.

Figure 8:
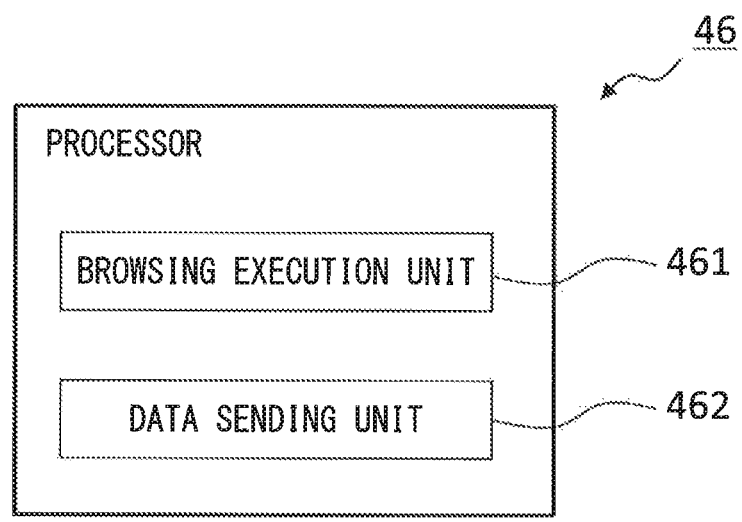
FIG. 8 is a functional block diagram of a processor included in the user terminal.

FIG. 8 is a functional block diagram of the processor included in the user terminal.

The processor 46 of the user terminal 4 includes, as functional blocks, a browsing execution unit 461 and a data sending unit 462. The respective units that the processor 46 includes are function modules that are implemented by programs executed in the processor 46. Alternatively, the respective units that the processor 46 includes may be implemented in the user terminal 4 as dedicated circuits.

The browsing execution unit 461 performs various types of operations, such as display on the display 44 and output to the user interface 43 based on data received via the communication interface 41.

The data sending unit 462 sends data, such as input that the user interface 43 accepted and images that the camera 45 generated, via the communication interface 41.

Figure 9:
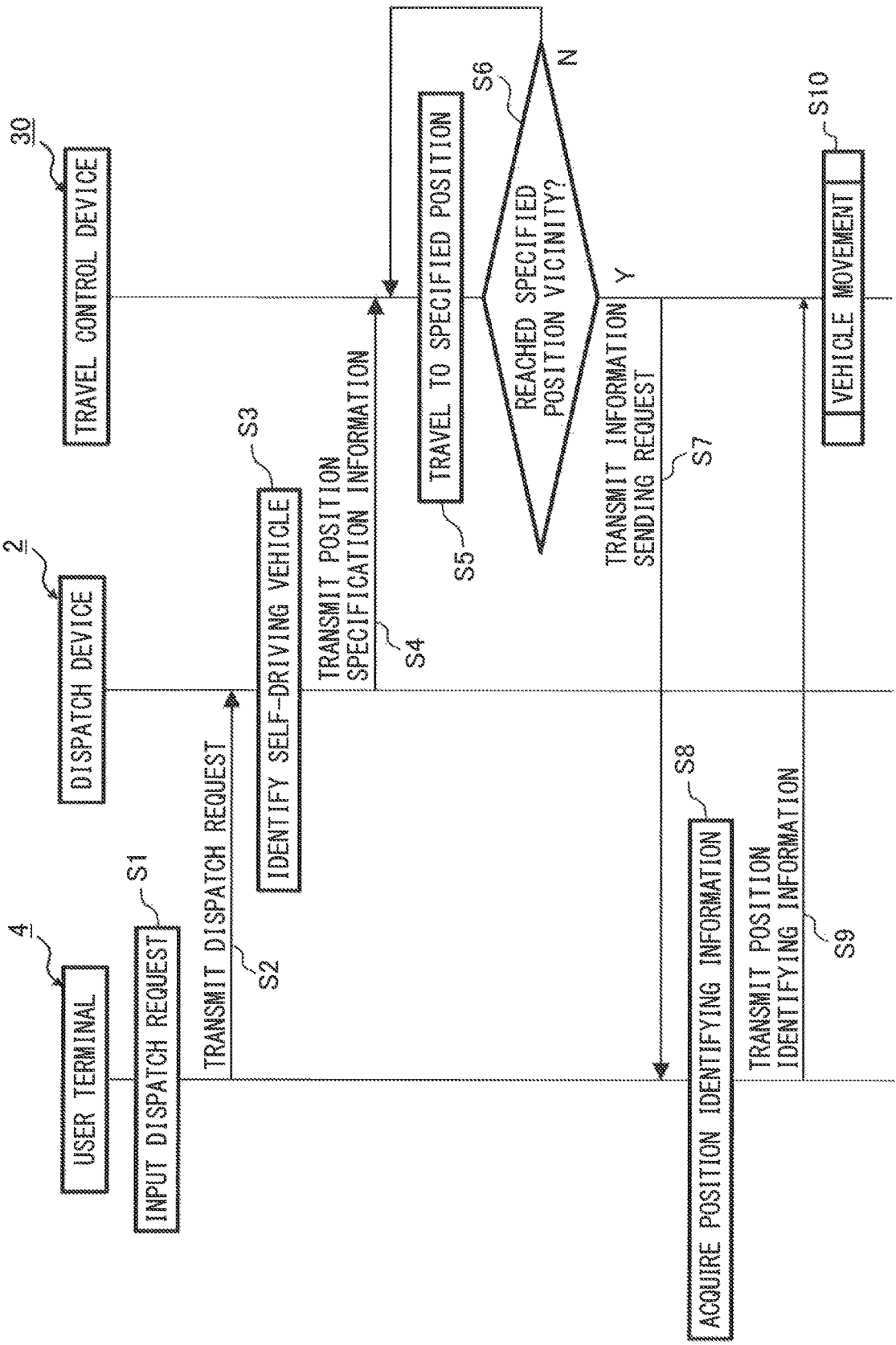
FIG. 9 illustrates a processing sequence of the transportation service provision system.

FIG. 9 illustrates a processing sequence of the transportation service providing system.

First, the user terminal 4 accepts an input of dispatch request information by the user P (step S1). The browsing execution unit 461 of the user terminal 4 makes the display 44 display a dispatch request screen, based on dispatch request screen display information received from the dispatch device 2 via the communication interface 41. The browsing execution unit 461 accepts, by means of the user interface 43, operation inputs by the user P for input of various types of information required for a dispatch request.

Next, the user terminal 4 transmits the dispatch request to the dispatch device 2 (step S2). The data sending unit 462 of the user terminal 4 accepts, by means of the user interface 43, operations (for example, a tap or a double click) by the user P into a predetermined area (for example, a transmit button) in the dispatch request screen. The data transmission unit 462 transmits the dispatch request to the dispatch device 2 via the communication interface 41. The dispatch request includes a specified position that is information on a position at which the user P desires to board an autonomous driving vehicle 3.

When receiving the dispatch request from the user terminal 4, the dispatch device 2 identifies an autonomous driving vehicle to be dispatched (step S3). The vehicle dispatch unit 232 of the dispatch device 2 identifies an autonomous driving vehicle(s) 3 that the user can board, based on boarding information of the autonomous driving vehicles. The vehicle dispatch unit 232 identifies, out of the autonomous driving vehicle(s) 3 that the user can board, an autonomous driving vehicle 3 that minimizes the time to reach the specified position indicated by the dispatch request.

Next, the dispatch device 2 transmits position identifying information to the identified autonomous driving vehicle 3 (step S4). The vehicle dispatch unit 232 of the dispatch device 2 transmits position identifying information specifying, as a destination, the specified position specified by the dispatch request, via the communication interface 21. The position identifying information includes the specified position included in the dispatch request.

When receiving the position identifying information from the dispatch device 2, the travel control device 30 of the autonomous driving vehicle 3 makes the autonomous driving vehicle 3 travel in such a way that the autonomous driving vehicle 3 arrives at the specified position included in the position identifying information (step S5). The specified position travel unit 3031 of the travel control device 30 stores the received specified position in the memory 302, controls operation of the engine 35, etc., and makes the autonomous driving vehicle 3 travel toward the specified position.

Next, the travel control device 30 determines whether or not the autonomous driving vehicle 3 has reached a predetermined range from the specified position (step S6). The request transmission unit 3032 of the travel control device 30 determines that the autonomous driving vehicle 3 has reached the predetermined range when distance between the specified position stored in the memory 302 and the present position identified by the GNSS receiver 31 is less than a predetermined range threshold value stored in advance in the memory 302. Further, the request transmission unit 3032 may determine whether or not the autonomous driving vehicle 3 has reached the predetermined range, based on whether or not the present position identified by the GNSS receiver 31 is contained in a geographical range that is set in advance with respect to each specified position.

When the autonomous driving vehicle 3 is determined not to have reached the predetermined range from the specified position (step S6: N), the processing of the travel control device 30 returns to step S5.

When the autonomous driving vehicle 3 is determined to have reached the predetermined range from the specified position (step S6: Y), the travel control device 30 transmits an information sending request to the user terminal 4 via the data communication module 32 (step S7). The information sending request is information notifying that the autonomous driving vehicle has reached a vicinity of the specified position and therewith requesting sending of position identifying information for identifying a position at which the user P intends to board the autonomous driving vehicle 3.

When receiving the information sending request, the user terminal 4 acquires position identifying information (step S8). The acquisition of position identifying information will be described later.

Next, the data transmission unit 462 of the user terminal 4 transmits the acquired position identifying information to the travel control device 30 of the autonomous driving vehicle 3 via the communication interface 41 (step S9).

When the travel control device 30 receives the position identifying information, the position change unit 3033 of the travel control device 30 performs vehicle position change processing (step S10), and a series of processing is terminated. The vehicle position change processing is processing of, based on the position identifying information, making the autonomous driving vehicle 3 move in such a way that the autonomous driving vehicle 3 comes close to the user P, and details thereof will be described later.

Figure 10:
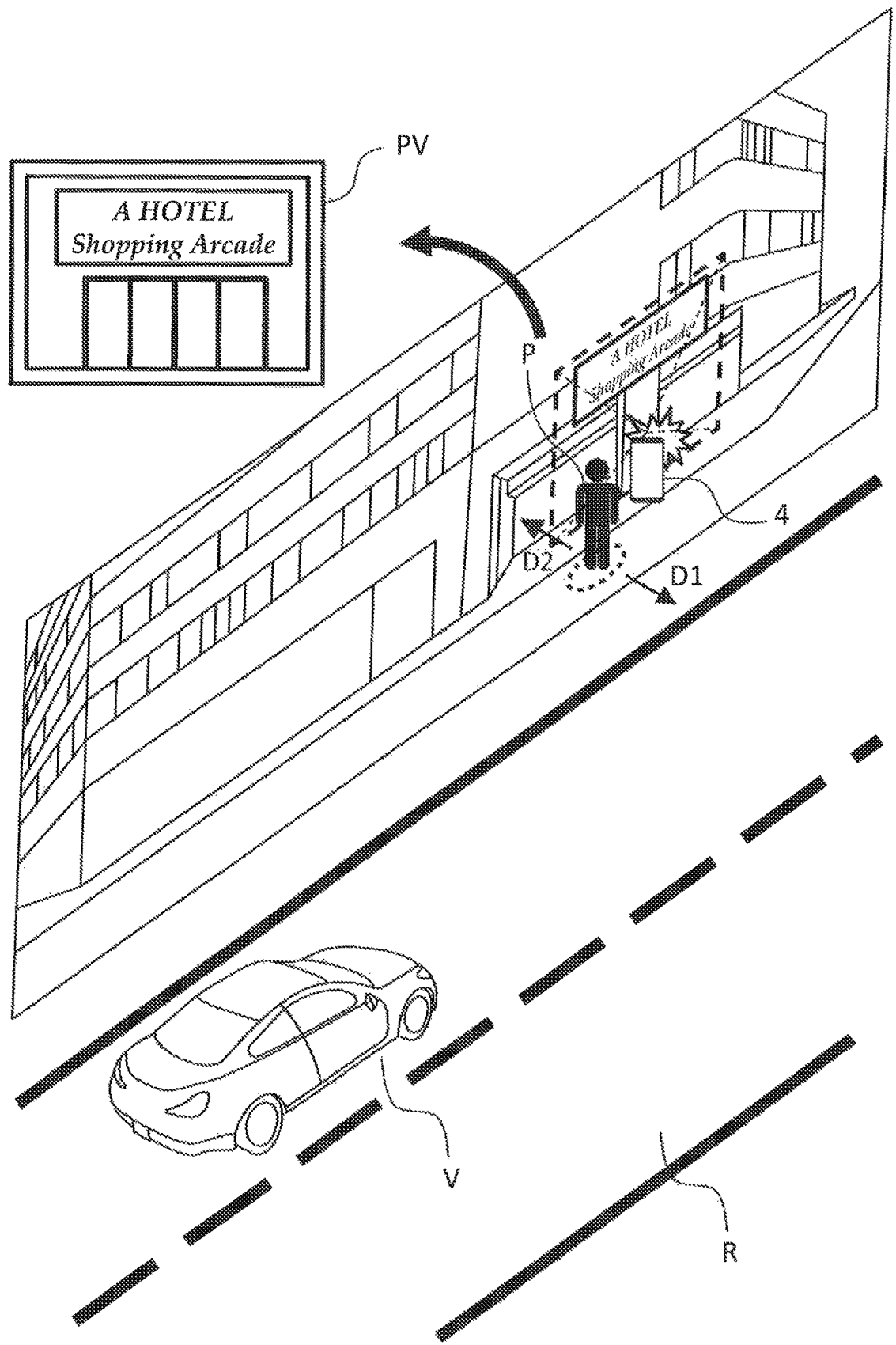
FIG. 10 is a schematic diagram describing shooting of a user periphery image by a user.

FIG. 10 is a schematic diagram describing shooting of a user periphery image by the user.

The user P refers to a screen displayed based on an information sending request requesting sending of a user periphery image depicting a peripheral region around the user, and captures a user periphery image PV, using the user terminal 4, which the user P has. The user periphery image is an example of the position identifying information. In this case, the information sending request preferably requests the user P to capture, from the position of the user P, an image in a direction D2 that is the opposite direction to a direction D1 directed toward the vehicle traffic side. Since an image in the direction D2, which depicts the building side, has a larger variation due to change in the position than an image in the direction D1, which depicts the road side, identification of a position based on an image captured in the direction D2 is easier than identification of a position based on an image captured in the direction D1. For this reason, the request transmission unit 3032 of the autonomous driving vehicle 3 transmits, to the user terminal 4, image sending request display information for displaying, on the display 44 of the user terminal 4, a message, such as "Please capture an image of a building around you" and "Please capture an image with your back turned to the road". When seeing the message displayed on the display 44, the user P, following the message, captures an image in the direction D2.

Note that, in response to the information sending request, the user P may transmit an image stored in the memory 42 to the travel control device 30 as a user periphery image.

Figure 11:
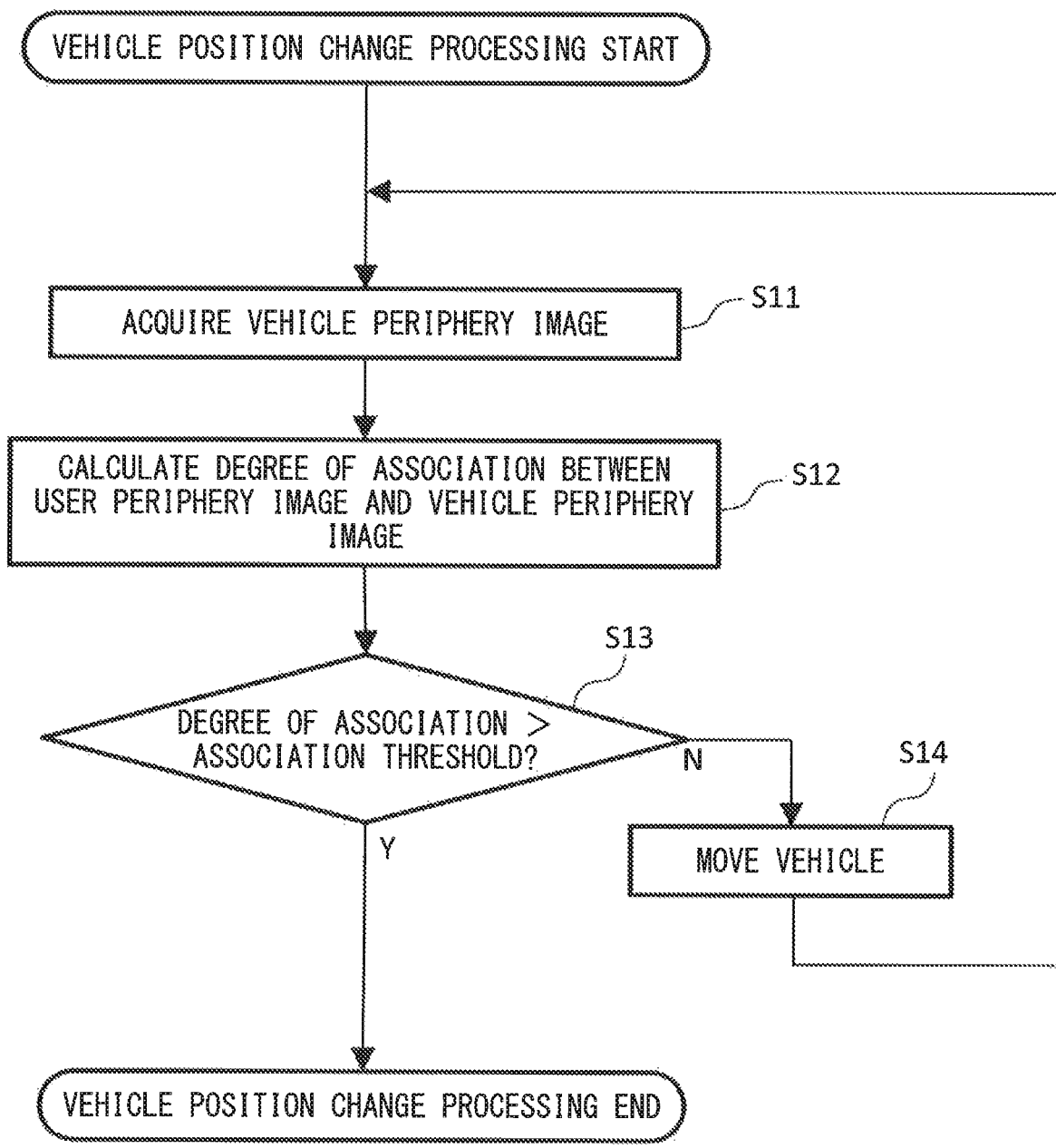
FIG. 11 is a first processing flowchart of vehicle position change processing in the travel control device.

FIG. 11 is a first processing flowchart of vehicle position change processing in the travel control device 30. In the first processing flowchart, the travel control device 30, using a vehicle periphery image acquired by the camera 33 at the present position of the autonomous driving vehicle 3, makes the autonomous driving vehicle 3 move.

When the vehicle position change processing (step S5) is started, the vehicle periphery image acquisition unit 3034 acquires a vehicle periphery image that is an image generated by the camera 33 and depicting a peripheral region around the autonomous driving vehicle 3 (step S11).

Next, the position change unit 3033 calculates a relevance level between the user periphery image and the vehicle periphery image (step S12). The position change unit 3033 determines whether or not the calculated relevance level is greater than a relevance threshold value (step S13).

The relevance level is a value reflecting a level to which a user periphery image and a vehicle periphery image are related with each other. For example, the position change unit 3033 applies a detector, such as SIFT and AKAZE, to either of the images and thereby detects a plurality of feature points and, with respect to each of the detected feature points, sets a region with a fixed size containing the feature point as a template. Further, the position change unit 3033, with respect to each feature point, executes template matching between a template containing the feature point and the other image and thereby calculates a correlation value between the template and a region that the template matches most. The position change unit 3033 calculates, as a relevance level, a ratio of the number of feature points at which the calculated correlation value is equal to or greater than a predetermined threshold value to the total number of feature points. The position change unit 3033 may calculate a relevance level by means of other methods.

When the calculated relevance level is not determined to be greater than the relevance threshold value (N in step S13), the position change unit 3033 controls operation of the engine 35, etc., and thereby makes the autonomous driving vehicle 3 move (step S14). For example, the position change unit 3033 advances the autonomous driving vehicle 3 by a preset unit distance within the predetermined range from the specified position on the road on which the autonomous driving vehicle 3 can travel. When the road splits, the position change unit 3033 makes the autonomous driving vehicle 3 travel the respective roads after the split successively. Subsequently, the processing of the position change unit 3033 returns to step S11, and the travel control device 30 acquires a vehicle periphery image at a vehicle position after movement, and calculates and compares a relevance level.

When the calculated relevance level is determined to be greater than the relevance threshold value (step S13: Y), the position change unit 3033 terminates the vehicle position change processing. At this time, the user periphery image and the vehicle periphery image are sufficiently related to each other, and the vehicle position of the autonomous driving vehicle is in sufficient proximity to the user.

Figure 12:
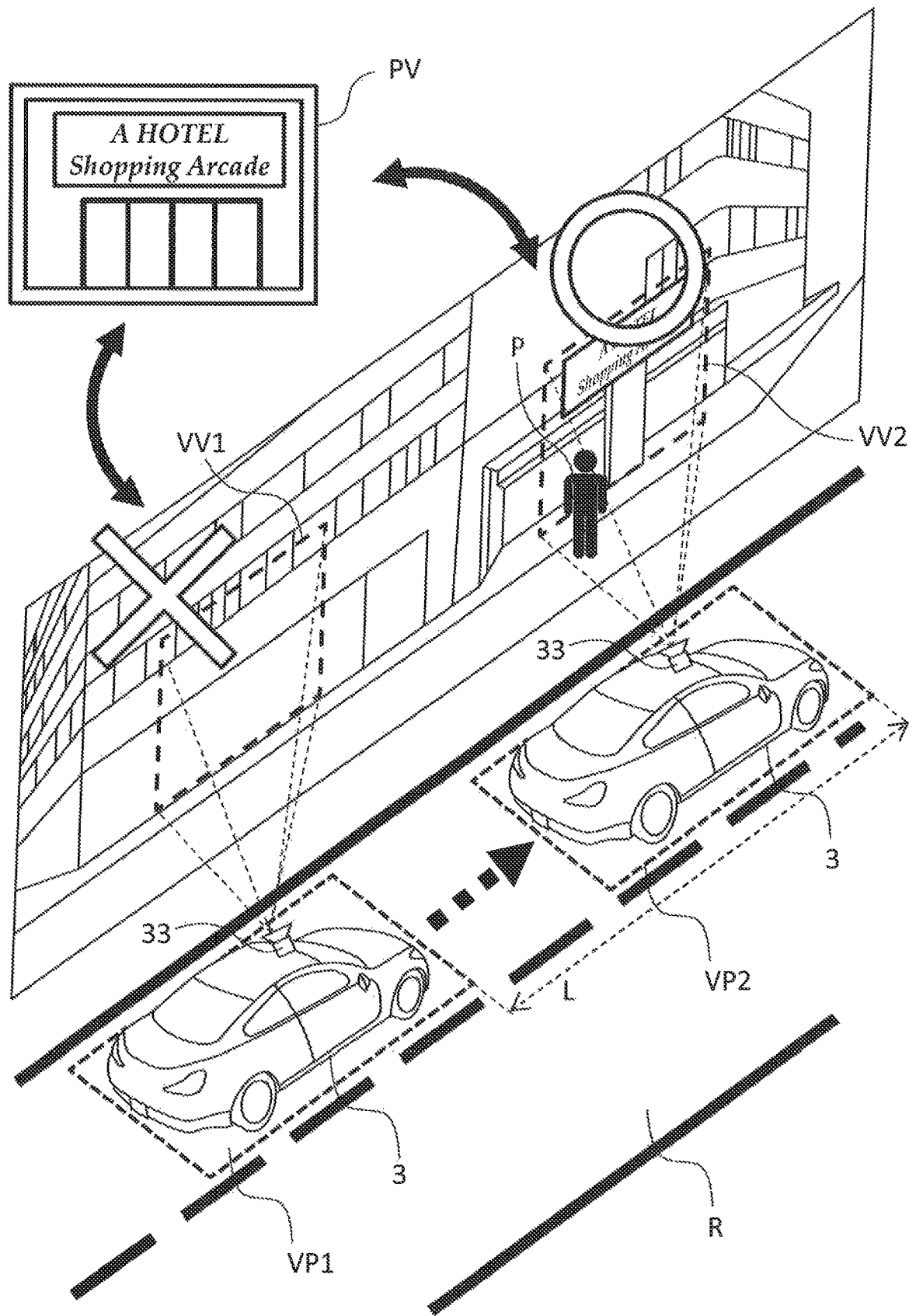
FIG. 12 is a schematic diagram describing acquisition of vehicle periphery images by a camera.

FIG. 12 is a schematic diagram describing acquisition of vehicle periphery images by the camera.

The vehicle periphery image acquisition unit 3034 acquires a vehicle periphery image VV1 at a position VP1 by the camera 33. The position change unit 3033 calculates a relevance level between the vehicle periphery image VV1 and the user periphery image PV.

The relevance level between the user periphery image PV and the vehicle periphery image VV1, acquired at the position VP1, is less than the relevance threshold value. Therefore, the position change unit 3033 controls operation of the engine 35, etc., and thereby makes the autonomous driving vehicle 3 move from the position VP1 to a position VP2.

The position VP2 is a position that is advanced from the position VP1 in the direction of movement of the autonomous driving vehicle 3 by length L. The length L is stored in advance in the memory 302 of the travel control device 30. The processor 303 may store, in the memory 302, a value of the length L received from the dispatch device 2 via the data communication module 32. A common length L may be used for all positions along which the autonomous driving vehicle 3 travels or different lengths L may be used depending on positions along which the autonomous driving vehicle 3 travels.

The vehicle periphery image acquisition unit 3034 acquires a vehicle periphery image VV2 at the position VP2 by means of the camera 33. The position change unit 3033 calculates a relevance level between the vehicle periphery image VV2 and the user periphery image PV.

The relevance level between the user periphery image PV and the vehicle periphery image VV2, acquired at the position VP2, is greater than the relevance threshold value. Therefore, the position change unit 3033 terminates the vehicle position change processing. At this time, the vehicle position of the autonomous driving vehicle 3 is in sufficient proximity to the user P.

Note that, when a feature point corresponding to a feature point included in the user periphery image PV is included in the vehicle periphery image, the position change unit 3033 may make the autonomous driving vehicle 3 move in such a way that the position of the feature point in the user periphery image PV comes close to the position of the feature point in the vehicle periphery image. For example, when calculating a relevance level between the user periphery image PV and the vehicle periphery image, the position change unit 3033 calculates a vector, based on the position of a template in one of the images and the position of a region in the other image corresponding to the template. The position change unit 3033, using the capturing direction of the camera 33 of the autonomous driving vehicle 3 as a reference direction, identifies the direction of a vector originating from the feature point in the vehicle periphery image and directed toward the feature point in the user periphery image PV. The position change unit 3033 makes the autonomous driving vehicle travel in a direction closest to the direction of the identified vector among the directions in which the autonomous driving vehicle 3 can travel. Bringing the position of a feature point in the user periphery image PV and the position of a feature point in the vehicle periphery image close to each other enables the relevance level between the user periphery image PV and the vehicle periphery image to be increased.

Figure 13:
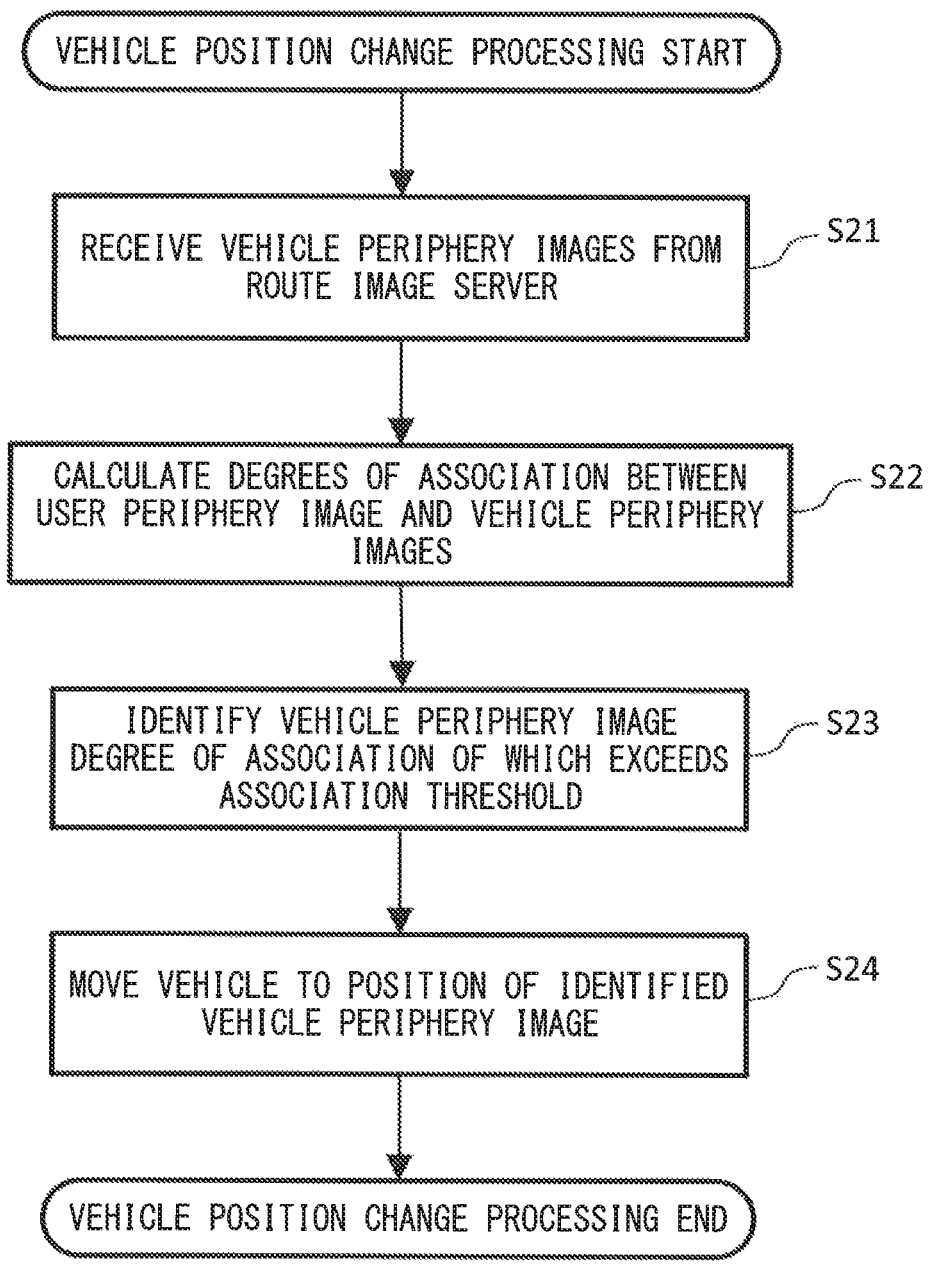
FIG. 13 is a second processing flowchart of the vehicle position change processing in the travel control device.

FIG. 13 is a second processing flowchart of the vehicle position change processing in the travel control device 30. The travel control device 30 may perform the second processing flowchart in place of the first processing flowchart. In the second processing flowchart, the travel control device 30 acquires a vehicle periphery image from the route image server and makes the autonomous driving vehicle move.

When the vehicle position change processing (step S5) is started, the vehicle periphery image acquisition unit 3034 acquires vehicle periphery images that are images depicting a peripheral region around the autonomous driving vehicle 3 from the route image server (step S21). In this case, the vehicle periphery image acquisition unit 3034 acquires a plurality of vehicle periphery images that are respectively associated with a plurality of pieces of position information within a predetermined range containing the present position of the autonomous driving vehicle 3.

Next, the position change unit 3033 calculates relevance level between the user periphery image and the respective vehicle periphery images (step S22). The position change unit 3033 identifies a vehicle periphery image the relevance level of which exceeds the relevance threshold value out of the plurality of vehicle periphery images (step S23). When there are a plurality of vehicle periphery images the relevance level of which exceed the relevance threshold value, the position change unit 3033 identifies a vehicle periphery image having the highest relevance level.

The position change unit 3033 controls operation of the engine 35, etc., and thereby makes the autonomous driving vehicle 3 move to the position associated with the identified vehicle periphery image (step S24) and terminates the vehicle position change processing.

Figure 14:
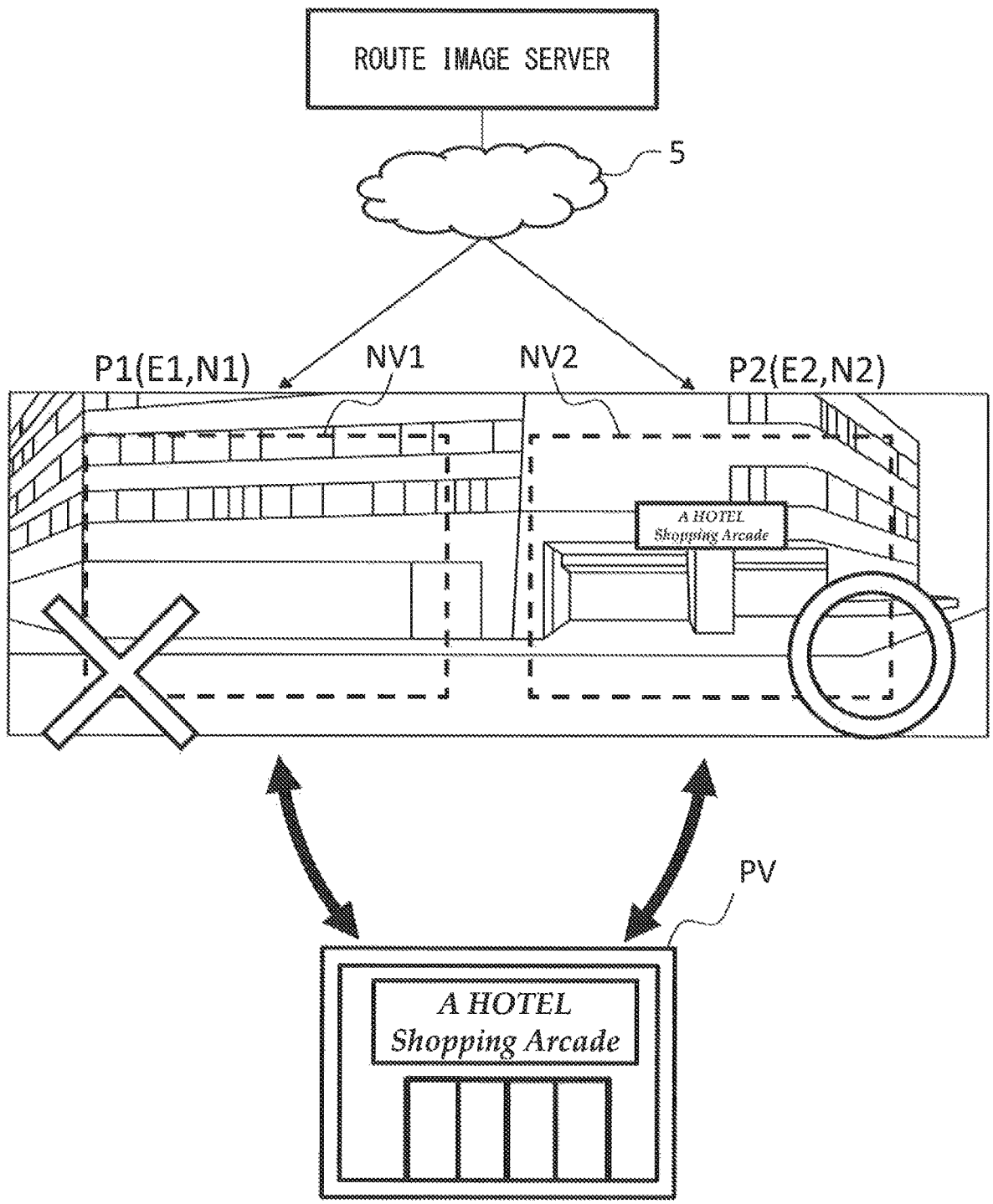
FIG. 14 is a schematic diagram describing acquisition of vehicle periphery images from a route image server.

FIG. 14 is a schematic diagram describing acquisition of vehicle periphery images from the route image server.

The vehicle periphery image acquisition unit 3034 acquires a plurality of vehicle periphery images NV1 and NV2 from the route image server via the network 5. The vehicle periphery images NV1 and NV2 are associated with positions P1 and P2, respectively. The vehicle periphery images NV1 and NV2 are images in a side surface direction along a route.

The position change unit 3033 calculates a relevance level between each of the vehicle periphery images NV1 and NV2 and the user periphery image PV. The position change unit 3033 identifies the vehicle periphery image NV2 the relevance level of which exceeds the relevance threshold value and controls operation of the engine 35, etc., and thereby makes the autonomous driving vehicle 3 move to the position P2, which is associated with the vehicle periphery image NV2.

FIG. 15 is a third processing flowchart of the vehicle position change processing in the travel control device 30. The travel control device 30 may perform the third processing flowchart in place of the first or second processing flowchart. In the third processing flowchart, the travel control device 30 makes the autonomous driving vehicle move to a position that is identified based on features extracted from the user periphery image.

The position change unit 3033 extracts a feature from the user periphery image (step S31). The feature extracted in the extraction is information, such as character information described on a signboard and a road sign contained in the user periphery image and the shape, pattern, color, and outline against the sky of a building.

The position change unit 3033 extracts a feature from the user periphery image by, for example, software, executed by the processor 303, referring to data stored in the memory 302.

In addition, the position change unit 3033 may extract a feature from the user periphery image by requesting an image processing server (not shown) to perform image processing and receiving a result via the communication interface 301.

The position change unit 3033 identifies a position corresponding to the user periphery image, based on the feature extracted from the user periphery image (step S32).

The position change unit 3033, for example, transmits the feature extracted from the user periphery image to a feature identification server (not shown) storing features and position information in association with each other, via the communication interface 301. The position change unit 3033 receives position information corresponding to the feature of the user periphery image from the feature identification server via the communication interface 301.

In addition, the position change unit 3033 may perform identification of position information corresponding to the feature extracted from the user periphery image, by software, executed by the processor 303, referring to data stored in the memory 302.

The position change unit 3033 controls operation of the engine 35, etc., and thereby makes the autonomous driving vehicle 3 move to the identified position (step S33).

Note that the position identifying information that the user terminal 4 acquires and transmits in response to reception of an information sending request that the request transmission unit 3032 of the travel control device 30 transmits is not limited to the user periphery image.

The position identifying information may be the name of a building in a peripheral region around the user. In this case, the request transmission unit 3032 transmits an information sending request requesting input of the name of the building in the peripheral region around the user. In response to the information sending request requesting input of the name of the building in the peripheral region around the user, the user operates the user interface 43 and thereby inputs the name of the building. The user terminal 4, when accepting a predetermined operation (for example, a tap on the transmit button) by the user, transmits the position identifying information via the communication interface 41. The user may input the name of the building in text or input the name of the building by selecting one out of the names, displayed on the display, of a plurality of buildings that exist in an area around the destination.

The position change unit 3033 of the travel control device 30 identifies a position, based on the name of the building in the peripheral region around the user, which is included in the position identifying information received from the user terminal 4, and makes the autonomous driving vehicle 3 move in such a way that the autonomous driving vehicle 3 comes close to the position of the building.

The position identifying information may be coordinate information corresponding to the position of the user. In this case, the request transmission unit 3032 transmits an information sending request requesting coordinate information corresponding to the position of the user. In response to the information sending request requesting coordinate information corresponding to the position of the user, the user operates the user interface 43 and thereby inputs the name of the building. The user terminal 4 acquires position information via a GNSS receiver (not shown) and transmits the position identifying information via the communication interface 41.

The position change unit 3033 of the travel control device 30 makes the autonomous driving vehicle 3 move in such a way that the autonomous driving vehicle 3 comes close to the position indicated by the coordinate information included in the position identifying information received from the user terminal 4.

It should be understood that various changes, replacements, or modifications can be made to the present invention without departing from the spirit and scope thereof.

REFERENCE SIGNS LIST

1 Transportation service providing system
3 Self-driving vehicle
30 Travel control device
3031 Specified position travel unit
3032 Request transmission unit
3033 Position change unit
3034 Vehicle periphery image acquisition unit
4 User terminal

What is claimed is:

1. A travel control device comprising:
a communication circuit configured to be communicable with an autonomous driving vehicle and a user terminal that a user who intends to board the autonomous driving vehicle has; and
processing circuitry configured to
make the autonomous driving vehicle travel in such a way that the autonomous driving vehicle arrives at a specified position specified by the user,
when the autonomous driving vehicle has reached a predetermined range from the specified position, transmit an information sending request requesting sending of a user periphery image depicting a peripheral region around the user to the user terminal via the communication circuit, and
when receiving the user periphery image via the communication circuit, change a position of the autonomous driving vehicle, based on the user periphery image in such a way that the autonomous driving vehicle comes close to the user.

2. The travel control device according to claim 1, wherein the processing circuitry is further configured to, when receiving the user periphery image via the communication circuit,
specify a position of a feature point included in the user periphery image and a position of a feature point corresponding to the feature point in the user periphery image included in a vehicle periphery image that depicts a peripheral region around the autonomous driving vehicle,
identify a vector originating from the feature point in the vehicle periphery image and directed toward the feature point in the user periphery image by using the capturing direction of the camera as a reference direction, and
change the position of the autonomous driving vehicle by setting a direction of the autonomous vehicle in a direction closest to a direction of the vector among the directions in which the autonomous driving vehicle can travel.

3. The travel control device according to claim 2, wherein the processing circuitry is further configured to acquire from a camera disposed on the autonomous driving vehicle a periphery image captured by the camera and depicting a peripheral region around the autonomous driving vehicle as the vehicle periphery image.

4. The travel control device according to claim 2, wherein the processing circuitry is further configured to
acquire, via the communication circuit from a route image server storing, in association with position information, a plurality of periphery images on a route along which the autonomous driving vehicle travels, a periphery image depicting a peripheral region around the autonomous driving vehicle among the plurality of periphery images as the vehicle periphery image.

5. The travel control device according to claim 2, wherein the processing circuitry is further configured to,
in transmission of the information sending request, request transmission of an image of an opposite side of a position of the user to a side on which the autonomous driving vehicle travels.

6. A travel control method for controlling travel of a autonomous driving vehicle by means of a travel control device, the method comprising:

the travel control device making the autonomous driving vehicle travel in such a way that the autonomous driving vehicle arrives at a specified position specified by a user who intends to board the autonomous driving vehicle;

when the autonomous driving vehicle has reached a predetermined range from the specified position, the travel control device transmitting, to a user terminal that the user has, an information sending request requesting sending of a user periphery image depicting a peripheral region around the user via a communication circuit configured to be communicable with the user terminal; and when receiving the user periphery image via the communication circuit, the travel control device making the autonomous driving vehicle move, based on the user periphery image in such a way that the autonomous driving vehicle comes close to the user.

* * * * *